(12) United States Patent
Buck

(10) Patent No.: US 12,419,465 B2
(45) Date of Patent: Sep. 23, 2025

(54) BAKING ATTACHMENT FOR A KITCHEN APPLIANCE

(71) Applicant: Smart Product Concepts Limited, Hong Kong (HK)

(72) Inventor: Markus Buck, Mid Levels Central (HK)

(73) Assignee: Smart Product Concepts Limited, Hong Kong (HK)

( * ) Notice: Subject to any disclaimer, the term of this patent is extended or adjusted under 35 U.S.C. 154(b) by 1124 days.

(21) Appl. No.: 17/219,997

(22) Filed: Apr. 1, 2021

(65) Prior Publication Data

US 2021/0315216 A1 Oct. 14, 2021

(30) Foreign Application Priority Data

Apr. 9, 2020 (EP) ..................................... 20168988

(51) Int. Cl.
*A47J 43/046* (2006.01)
*A47J 43/07* (2006.01)
*A47J 43/08* (2006.01)

(52) U.S. Cl.
CPC ......... *A47J 43/046* (2013.01); *A47J 43/0727* (2013.01); *A47J 43/085* (2013.01)

(58) Field of Classification Search
CPC ........... A21B 7/005; A21B 3/135; A21C 1/02; A21C 1/141; A21C 1/146; A21C 1/1465;
(Continued)

(56) References Cited

U.S. PATENT DOCUMENTS

2016/0120367 A1* 5/2016 Braun ................. A47J 43/0727
366/314
2016/0174771 A1* 6/2016 Benoit .................... A47J 27/09
99/348
(Continued)

FOREIGN PATENT DOCUMENTS

CN        2746862     * 12/2005
CN        2746862 Y    12/2005
(Continued)

OTHER PUBLICATIONS

CN2746862 (Year: 2024).*
CN105559635 (Year: 2024).*
WO2017144907 (Year: 2024).*

*Primary Examiner* — Reginald Alexander
(74) *Attorney, Agent, or Firm* — IDEA Intellectual Limited; Sam T. Yip

(57) ABSTRACT

A baking attachment for a kitchen appliance has an outer container with inner walls enclosing a receiving compartment and an insertion opening on an upper side. A preparation container is arranged in the receiving compartment. A heating device is provided in an intermediate space between a base and side walls of the preparation container and inner walls of outer container. A mixing and kneading mechanism and a cover for the insertion opening are provided. The outer container detachably inserts into a receiving section of the kitchen appliance base. A free end of a rotary shaft of the mixing and kneading mechanism arranged in a connection section has a first coupling section for rotationally fixed connection to a second coupling section on a drive shaft of the kitchen appliance base. Electrical contact elements of the heating device in the connection section detachable connect to electrical contacts of a kitchen appliance base.

19 Claims, 6 Drawing Sheets

(58) Field of Classification Search
CPC ...... A21C 1/1485; A21C 1/1495; A47J 36/32; A47J 37/015; A47J 43/046; A47J 43/0727; A47J 43/085; A47J 220/00
USPC .......................................................... 99/331
See application file for complete search history.

(56) References Cited

U.S. PATENT DOCUMENTS

| | | | |
|---|---|---|---|
| 2017/0071413 A1* | 3/2017 | Park | A47J 27/004 |
| 2019/0174945 A1* | 6/2019 | Oti | A47J 27/004 |
| 2020/0000276 A1* | 1/2020 | Kemker | A47J 44/00 |

FOREIGN PATENT DOCUMENTS

| | | | |
|---|---|---|---|
| CN | 103040379 | * | 4/2013 |
| CN | 105559635 | * | 5/2016 |
| CN | 105559635 A | | 11/2016 |
| DE | 10019126 | | 10/2001 |
| DE | 69820458 | | 5/2004 |
| EP | 3501353 | * | 6/2021 |
| WO | WO2017144907 | * | 8/2017 |

* cited by examiner

BAKING ATTACHMENT FOR A KITCHEN APPLIANCE

TECHNICAL FIELD

The present invention relates to a baking attachment for a kitchen appliance.

BACKGROUND

Background Information

There are kitchen appliances known which are used for preparing cooked meals; in this case, the cooked meals can be prepared in extensively automatic sequences and particularly also according to predefined recipes. Such kitchen appliances comprise a kitchen appliance base and a cooking pot attachment which can be detachably connected to the kitchen appliance base. In modern units, the cooking pot attachment is equipped with a heating element, which can be supplied with heating current via plug-in contacts produced between the cooking pot attachment and the kitchen appliance base. The heating current is controlled by a controller in the kitchen appliance, which is arranged in the kitchen appliance base. Furthermore, a mixer is provided, which is arranged in the cooking pot attachment and can be driven in a rotating manner by a motor, arranged in the kitchen appliance base, for mixing and/or chopping up food to be cooked. To this end, a coupling connection is provided between a rotary shaft of the mixer, which typically passes through a pot base of the cooking pot attachment, and a drive shaft, which leads to a receiving section of the kitchen appliance base. Such a kitchen appliance is shown, for example, in DE 100 19 126 A1 and described in a special embodiment. Such kitchen appliances can currently be obtained from different suppliers on the market and are becoming increasingly more popular with end consumers. In many households, they facilitate the preparation of meals, and can even be programmed, such that other household activities or other work to be completed can be carried out, in addition to the preparation of the meal.

Furthermore, kitchen appliances are known which are designed especially for automated baking processes, particularly for baking bread, and for use in consumer households, so-called bread baking machines. An example of such a bread baking machine is shown and described in DE 698 20 458 T2. These machines are isolated units which comprise, in a common housing, a controller and a heating supply as well as a drive motor for a mixing and kneading mechanism as well as a baking pot insert, which is to be detachably inserted in a receiving compartment in the housing. A heating device is arranged in the receiving compartment for heating a baking region formed by the receiving compartment and thus a baked good contained in the baking pot insert. Baked goods such as, particularly, loaves of bread but also cakes or the like, can be prepared with such bread baking machines in extensively automated sequences. Most of the units enable programming such that, for example, the baking pot insert is filled with the ingredients required for preparing a loaf of bread, for example, on the evening beforehand, and a baking program can run overnight such that a freshly baked loaf of bread is available in the morning of the following day. These bread baking machines are also enjoying great popularity and can be found in many households.

However, one problem in many households is that the space available is limited, typically in kitchens in which the kitchen appliances and bread baking machines and further such units are set up. Accordingly, many households do not obtain the respective units and machines that they would otherwise happily use, simply because the existing room and space is not sufficient for setting up all of these units such as, for example, a kitchen appliance and a bread baking machine. And even when households have several of such units available, they oftentimes cannot be set up simultaneously, which often means that some of the units are stowed away in storage areas, such as in the basement or attic, due to only limited storage room frequently being available in the kitchen. Experience has shown that once units are placed into storage areas, they are normally seldom used, or even sometimes no longer used at all, such that these households which have a plurality of units for facilitating work in the kitchen oftentimes simply do not use them.

And finally, the costs play a role in the obtainment of a plurality of kitchen units, such as kitchen appliances and bread baking machines, particularly with each of the units that include the entire technology in the purchase, i.e. controller, drive, housing motor, inserts, etc., which makes the individual machines expensive to purchase.

SUMMARY

The invention is intended to be applied in this case and a remedy obtained, in that an option is provided to use a single kitchen unit, particularly a kitchen appliance, in more varied ways, and to do this with accessories which take up much less storage space. In addition, the invention is intended to obtain a possibility for providing a plurality of functions for automated support in the kitchen economically.

This object is initially achieved by means of a baking attachment for a kitchen appliance having the features of an outer container with inner walls, which enclose a receiving compartment, having an insertion opening at the top, a preparation container having a base and side walls, having an upper opening, having a preparation compartment, which preparation container is arranged in the receiving compartment such that an intermediate space is formed between the base and the side walls of the preparation container and the inner walls of the outer container enclosing the receiving compartment, a heating device arranged in the intermediate space, a mixing and kneading mechanism having a rotary shaft guided through the base of the preparation container and through a base section of the outer container as well as a mixing and kneading tool, which is connected to the rotary shaft, and arranged in the preparation container, and a cover for closing the insertion opening, wherein the outer container has a connection section in the region of the base section for detachable insertion into a receiving section of a kitchen appliance base, wherein a free end of the rotary shaft is arranged in the connection section, which free end has a first coupling section for rotationally fixed connection to a second coupling section arranged on a drive shaft of a kitchen appliance base, and wherein furthermore electrical contact elements electrically connected to the heating device are arranged in the connection section for detachable connection to electrical contacts of a kitchen appliance base. Advantageous refinements of such a baking attachment are that the preparation container may be designed to be detachably insertable into the receiving compartment. Furthermore, the mixing and kneading tool may be detachably connectable to the rotary shaft. Still further, the preparation container which may be inserted into the receiving compartment may have its upper opening positioned below the insertion opening such that the cover does not close the upper opening of the preparation container when it is arranged in a closing position which closes the insertion opening. Still further, connection structures may be provided on the outer container and mating structures may be provided on the cover, wherein the cover can be set lockingly due to the interaction between the connection structures and the mating structures on the outer container. The cover may be designed to be completely removable from the outer container. The baking attachment may further include a position indicator section provided on the cover for interacting with a position sensor on the kitchen appliance base for monitoring a cover position which is completely locked and closing off the receiving compartment. The baking attachment may further include a temperature sensor for determining a temperature of the preparation container, the air in the intermediate space, and/or a baked good situated in the preparation compartment, wherein a signal line of the temperature sensor may be connected to a signal contact element placed in the connection section. The baking attachment may further include an identification carrier, particularly an RFID chip, arranged on the baking attachment and configured for transmitting a piece of identification information to the kitchen appliance base. The outer container may be formed with double walls with an outer wall surrounding the inner walls, which leaves an intermediate space. The cover may have a, particularly central, opening, and a lid for optionally closing the opening. The cover may have a water vapor outlet opening.

A further aspect of a solution of the aforementioned object exists in a kitchen appliance having the features of a kitchen appliance base, which has a drive shaft and a motor for rotationally driving the drive shaft and which has a controller for controlling the motor and generating a heating current, wherein the kitchen appliance base has a receiving section, to which the drive shaft leads with a second coupling section and in which electrical contacts are arranged for applying the heating current, characterized in that the kitchen appliance has a baking attachment as described above, which connection section of the baking attachment can be inserted into the receiving section and thus can be detachably connected to the kitchen appliance base such that the electrical contact elements of the baking attachment have electrical contact with the electrical contacts of the kitchen appliance base and in that the rotary shaft with the first coupling section is connected to the drive shaft in a rotationally fixed manner via the second coupling section for driving the mixing and kneading mechanism. Advantageous refinements of such a baking attachment may include that the kitchen appliance base has a position sensor, which detects a position of the position indicator section in a position of the cover in which the outer container is secured and locked, and a signal is generated to the controller as a result of this detection. The baking attachment may be characterized by a reader device arranged in the kitchen appliance base for reading off the identification carrier, particularly an RFID reader, wherein the reader device is connected to the controller for transmitting data to the controller. The kitchen appliance may further have a cooking attachment with a cooking container, which encloses a cooking compartment and has an upper opening, a heating device arranged in the cooking container, and a mixer, which is particularly detachably arranged on the cooking container and protrudes into the cooking compartment, that comprises a rotary shaft and mixing means established on the rotary shaft, particularly mixing blades, as well as a cover for closing the upper opening of the cooking container, wherein the cooking container has a connection section and, in the connection section, a free end of the rotary shaft has electrical contact elements electrically connected to first coupling means and to the heating device, wherein the connection section of the cooking attachment can be inserted into the receiving section and thus can be detachably connected to the kitchen appliance base, in that the electrical contact elements of the cooking attachment have electrical contact with the electrical contacts of the kitchen appliance base, and in that the rotary shaft of the mixer with the first coupling section is connected, in a rotationally fixed manner, to the drive shaft via the second coupling section for driving the mixer.

According to the invention, a baking attachment for a kitchen appliance is indicated which firstly has an outer container. The outer container contains a receiving compartment, which is enclosed by inner walls, and has an insertion opening on the upper side. The outer container may particularly also have a base section, which can show particularly an opening. The baking attachment further has a preparation container. This preparation container has a base and side walls and an upper opening. A preparation container, which is accessible through the upper opening, is formed in the preparation compartment. The preparation container is arranged in the receiving compartment in a manner such that an intermediate space is formed between the base and the side walls of the preparation container and the inner walls of the outer container which enclose the receiving compartment, including any base of the outer container. A heating device is arranged in the intermediate space. Furthermore, the baking attachment has a mixing and kneading mechanism that has a rotary shaft guided through the base of the preparation container and through a base section of the outer container and a mixing and kneading tool, which is connected to the rotary shaft and arranged in the preparation container. Finally, the baking attachment has a cover for closing the insertion opening.

With the baking attachment according to the invention, the outer container has a connection section in the region of the base section for detachable insertion into a receiving section of a kitchen appliance base. A free end of the rotary shaft is arranged in this connection section, which free end has a first coupling section for rotationally fixed connection to a second coupling section arranged on a drive shaft of a kitchen appliance base. Furthermore, electrical contact elements electrically connected to the heating device are arranged in the connection section for detachable connection to electrical contacts of a kitchen appliance base.

Firstly, a baking attachment which is not durably integrated into a kitchen appliance is indicated with the invention, which baking attachment can be detachably connected to a kitchen appliance base as an attachment, and an automatically operable kitchen appliance is formed for baking with the kitchen appliance base, which is also called a bread baking machine. In particular, and this is a special focus of the invention, such a baking attachment can thus be adaptively produced and provided for a kitchen appliance base, which can simultaneously also be connected to other attachments, particularly a cooking attachment. This can also particularly be a previously existing kitchen appliance base which forms a kitchen appliance with a different function with a different attachment, e.g. a cooking attachment.

Accordingly, the kitchen appliance base can functionally be used with different attachments; various types of kitchen appliances, for example cooking machines, on the one hand, and baking machines, on the other, can be formed with such a kitchen appliance base and different functional attachments. Only one kitchen appliance base is needed with the elements integrated therein, particularly a drive motor, a controller, input and output modules, and the like, which saves investment costs, on the one hand, and enables a space-saving possibility, on the other hand, for realizing several functions of kitchen appliances in that, in addition to a known kitchen appliance, for example having a cooking function, a further complete kitchen appliance does not have to be obtained in the form of a baking machine, which is also characterized as a bread baking machine.

The connection to the kitchen appliance base takes place through the placement of the baking attachment onto the kitchen appliance base and, at the same time, insertion of the connection section into a receiving section of the kitchen appliance base, in which electrical contacts are established for operating particularly the heating device in this case simultaneously by means of detachably connecting the electrical contact elements to the electrical contacts in the kitchen appliance base, and additionally a torque transmission to the mixing and kneading mechanism is obtained due to the coupling between the rotary shaft and the drive shaft by means of the connection of the first and second coupling section. In use, it may be provided that the kitchen appliance base is adaptively designed for executing various program sequences as a function of whether the baking attachment according to the invention is connected to the kitchen appliance base or a different attachment such as, for example, a cooking attachment.

Advantageously, the preparation container with the baking attachment according to the invention is designed to be detachably insertable into the receiving compartment. Such a design is basically already known from existing baking machines. This is not only especially advantageous for a cleaning of the preparation container after use, but also for removing a finished baked good, for example a loaf of bread, from the preparation container. To do this, the preparation container can be removed from the receiving compartment and turned over, for example.

For similar reasons, it may be provided with advantage that the mixing and kneading mechanism can be detachably connected to the rotary shaft. This is also already known from existing baking machines. In this case as well, this measure facilitates a cleaning of the mixing and kneading mechanism and moreover also simplifies a removal of the finished baked good, in which the mixing and kneading mechanism initially remains in the baked good and is then loosened and removed separately.

Furthermore, the baking attachment according to the invention may be designed advantageously such that the preparation container inserted into the receiving compartment is positioned below the insertion opening with an upper opening such that the cover does not close the upper opening of the preparation container when it is arranged in a closing position which closes the insertion opening. Due to this design measure, air particularly heated by the heating element can directly reach the baked good through the upper opening and contribute to the formation of a crust on the baked bread. Moreover, water vapor formed during the baking process can escape the preparation container.

The baking attachment according to the invention may further advantageously have connection structures on the outer container as well as mating structures on the cover, in which the cover can be locked due to the interaction between the connection structures and the mating structures on the outer container. In particular, the cover can be designed so as to be completely removable from the outer container. Due to the connection structures and mating structures, the baking attachment can be durably closed such that the cover remains on the outer container, and the contents of the preparation container as well as the outer container are protected during operation, particularly also against intervention by an operator, who is then also protected, for example, from making contact with the hot preparation container. The option of completely removing the cover facilitates cleaning and handling of the preparation container. In addition, it is advantageous when the baking attachment is adapted to the design of further attachments for connecting to the kitchen appliance base, for example a cooking attachment, which typically also has a completely removable cover.

According to a further advantageous refinement, the baking attachment may have a position indicator section on the cover for interacting with a position sensor on the kitchen appliance base for monitoring a cover position which is completely locked and closing off the receiving compartment. Due to such a position indicator section and the position sensor, it is ensured that the kitchen appliance base can determine and monitor a completely closed and locked position of the cover. This is already known from cooking attachments and from the operation of kitchen appliances with such cooking attachments and particularly means that the kitchen appliance can only be placed into operation with respect to essentially hazardous operating modes, such as the operation of a mixer or a heater, once the cover is securely closed. In a similar manner, this can then also be implemented for use of such a designed baking attachment.

Furthermore, it may advantageously be provided that the baking attachment according to the invention has a temperature sensor for determining a temperature of the preparation container, the air in the intermediate space, and/or a baked good situated in the preparation compartment. A signal line from the temperature sensor is then connected to a signal contact element placed in the connection section. This signal contact element can then, in turn, be detachably coupled and connected to a signal contact on the kitchen appliance base when the baking attachment has its connection section detachably inserted into the receiving section of a suitable kitchen appliance base. In this manner, it is possible to obtain a response regarding the operating temperature in the baking attachment and to transmit this to a controller of the kitchen appliance base.

Furthermore, it may advantageously be provided with the baking attachment according to the invention that an identification carrier is arranged therein. This identification carrier is configured for transmitting a piece of identification information to a kitchen appliance base. This may be, for example, an RFID chip. Such an identification carrier may contain, for example, a piece of identification information which enables the kitchen appliance base to detect, by means of a corresponding reader, that the attachment is a baking attachment. Accordingly, a basic setting of the controller can take place in the kitchen appliance base which is suitable or required for the operation of the baking attachment and the kitchen appliance obtained by the combination of the kitchen appliance base and the baking attachment, in the form of a baking machine. For example, different rotational speeds of the drive shaft can be predefined either for operating the kitchen appliance with a baking attachment or with a cooking attachment; different heating capacities may also be provided. Furthermore, the heating elements of cooking attachments, baking attachments, or similar attachments may have different electrical properties, particularly electrical resistances, such that, for example, heating currents are measured differently, or heating ramps are approached differently depending on which attachment is currently placed on the kitchen appliance base.

With the baking attachment according to the invention, it may advantageously be provided that the outer container is formed with double walls with an outer wall surrounding the inner walls which enables an intermediate space. Particularly a thermal insulation can be achieved by such a design such that particularly the outer container with its outer wall continues to remain comparatively cool even during operation, particularly below a temperature which is hazardous to people with respect to potential injuries caused by burns.

With the baking attachment according to the invention, it may further advantageously be provided that the cover has a, particularly central, opening and a lid for optionally closing the opening. This opening may be provided, for example, for further filling of baking ingredients such that the entire cover does not have to be removed but only the lid of the opening. The lid may be, for example and particularly, transparently designed such that a user can see into the preparation container through its upper opening due to this transparent lid. It may be possible to detachably connect the lid to the cover, particularly with suitable means, for example using magnets or the like. A monitor may also be provided here which switches off, for example, the mixing, and kneading mechanism when the lid is open.

Furthermore, it may advantageously be provided with the baking attachment according to the invention that a water vapor outlet opening is formed in the cover. Such a water vapor outlet opening can mean that water vapor resulting during the baking process escapes from the preparation container and the outer container thus keeping the baked good from becoming excessively moist and hereby potentially not baking properly. The opening diameter of the water vapor outlet opening is dimensioned in a manner such that there is a sufficient opening cross-section for the escaping water vapor but that an intervention cannot take place through this opening. Advantageously, the water vapor outlet opening may be arranged not centrally, particularly in a region which is outside of the arrangement region of the preparation container in a perpendicular projection.

A further solution aspect the invention indicates with respect to the aforementioned object exists in a kitchen appliance with a kitchen appliance base having a drive shaft and a motor for rotationally driving the drive shaft. The kitchen appliance base further has a controller for controlling the motor and generating a heating current. Furthermore, the kitchen appliance base has a receiving section, to which the drive shaft leads with a second coupling section and in which electrical contacts are arranged for applying the heating current. The kitchen appliance has a baking attachment according to the invention as it is previously described. The connection section of this baking attachment can be inserted into the receiving section of the kitchen appliance base and, in doing so, can be detachably connected to the kitchen appliance base such that the electrical contact elements of the baking attachment have electrical contact with the electrical contacts of the kitchen appliance base and that the rotary shaft with the first coupling section is connected to the drive shaft of the kitchen appliance base in a rotationally fixed manner via the second coupling section for driving the mixing and kneading mechanism.

In such a kitchen appliance according to the invention, thus a combination is provided of kitchen appliance base, on the one hand, and baking attachment according to the previously described type, on the other hand, in which a kitchen appliance is formed in the form of a baking machine due to the corresponding design of the connection section and receiving section and corresponding arrangement of the two coupling elements, on the one hand, as well as the electrical contact element and electrical contacts, on the other hand, by means of placement of the baking attachment on the kitchen appliance base with a connection section fittingly arranged in the receiving section. The kitchen appliance base of the kitchen appliance according to the invention may advantageously have a position sensor, which detects a position of the position indicator section, which is provided on the cover of the baking attachment, in a position of the cover in which the outer container is durably closed and locked, and a signal is generated to the controller as a result of this detection. This signal generated to the controller can then particularly mean that a work sequence and operation of the kitchen appliance is enabled, particularly an initialization of the heater and/or of the mixing and kneading mechanism, such that, in other words, such an operation is not possible without a corresponding response of the position sensor; it is suppressed by the controller.

Furthermore, the kitchen appliance according to the invention may advantageously be designed such that it has a reader device for reading off the identification carrier, when the baking attachment has an identification carrier, particularly an RFID reader, in which the reader device is connected to the controller for transmitting data to the controller. In this manner, the kitchen appliance base can determine that the baking attachment is placed and connected to the kitchen appliance base for forming the kitchen appliance and can configure its operation automatically based on the corresponding sequences which are required for the operation as a baking machine.

According to the invention, it may finally be provided that the kitchen appliance further has a cooking attachment with a cooking container, which encloses a cooking compartment and has an upper opening, a heating device arranged in the cooking container, and a mixer, which is particularly detachably arranged on the cooking container and protrudes into the cooking compartment, that comprises a rotary shaft and mixing means established on the rotary shaft, particularly mixing blades. The cooking attachment further has a cover for closing the upper opening of the cooking container. The cooking container in this case has a connection section and a free end of the rotary shaft with first coupling means in the connection section as well as electrical contact elements electrically connected to the heating device. A connection section of the cooking attachment can be inserted into the receiving section of the kitchen appliance base and thus can be detachably connected to the kitchen appliance base such that the electrical contact elements of the cooking attachment have electrical contact with the electrical contacts of the kitchen appliance base and that the rotary shaft of the mixer with the first coupling section is connected to the drive shaft in a rotationally fixed manner via the second coupling section for driving the mixer.

According to the invention, in addition to a single kitchen appliance base, two attachments, namely a baking attachment of the previously described type and a cooking attachment as previously explained, can thus be contained in the kitchen appliance, which can be connected to the kitchen appliance base or can be placed thereupon, for forming different types of a kitchen appliance, namely of a baking machine or a cooking machine. Such a combination may also be characterized as a kitchen appliance system. The connection section of the baking attachment and cooking attachment in this case are shaped and formed similarly such that they each can be accommodated in the receiving section of the kitchen appliance base and such that, in doing so, a connection of the drive shaft of the kitchen appliance base to the respective rotary shaft can be formed for rotational driving of the mixing and kneading mechanism or the mixer, on the one hand, and the electrical contact elements enter into a mechanical and electrical connection with the electrical contacts, on the other hand, such that a heating current can be transmitted to the respective attachment controlled by the controller in the kitchen appliance base. The cooking attachment in this case may also have a temperature sensor for recording a temperature of the cooking container, of the contents to be cooked or the like, and a signal line of the temperature sensor can be connected to a signal contact element placed in the connection section. This signal contact element is then, in turn, arranged in the connection section such that it has contact with a single contact in the receiving section when the connection section of the cooking attachment is fittingly arranged in the receiving section and is thus connected to the kitchen appliance base. The cooking attachment can also be provided with an identification carrier, for example an RFID chip, which can be read off with a corresponding reader on the kitchen appliance base. In this manner, once the cooking attachment is placed, the kitchen appliance base, or more precisely the controller thereof, can be adapted to the operation of the cooking attachment, and a corresponding basic setting can be carried out in the controller completely automatically. A detection of the placed attachment in this case may also influence, for example, an output to the user in that the user is displayed, for example on a display device of the kitchen appliance base, cooking recipes to be processed with the cooking attachment and by means of the kitchen appliance (cooking machine) formed by arrangement of same on the kitchen appliance base when the cooking attachment is placed, or corresponding baking recipes when the baking attachment is placed, for example.

The baking attachment and the cooking attachment can be matched to each other or formed similarly, particularly with respect to the height thereof, but also with respect to other dimensions, such that they can be connected to the kitchen appliance base, e.g. also to the extent that the respective covers can be locked and a locking of the kitchen appliance base can be determined.

Finally, the kitchen appliance base may have further functions usable for baking and/or cooking attachments such as, for example, a weighing device for weighing ingredients placed in the baking attachment and/or the cooking attachment connected to the base.

In particular, the design of a kitchen appliance as previously described which particularly has several attachments, precisely a baking attachment as previously described and a cooking attachment, is associated with a special advantage such that kitchen appliances of various functionalities can be obtained with a single kitchen appliance base and specifically different attachments. In this case, it is specifically not necessary to obtain a complete infrastructure with controller, motor, and the like arranged in a housing for each of the kitchen appliances. Instead, the kitchen appliances are simply generated by optional selection of the suitable attachments. This saves costs, on the one hand, and reduces the spaced needed for arrangement and housing of the equipment, on the other hand.

BRIEF DESCRIPTION OF THE SEVERAL VIEWS OF THE DRAWINGS

Further advantages and features of the invention result from the following description of potential embodiments by means of the enclosed figures. The following is shown.

DETAILED DESCRIPTION

Possible exemplary embodiments and variants are shown as sketches in the figures. The figures in this case are not design drawings but instead should be understood as technical drawings which serve to illustrate the essential features and characteristics of the embodiments according to the invention.

Figure 1:
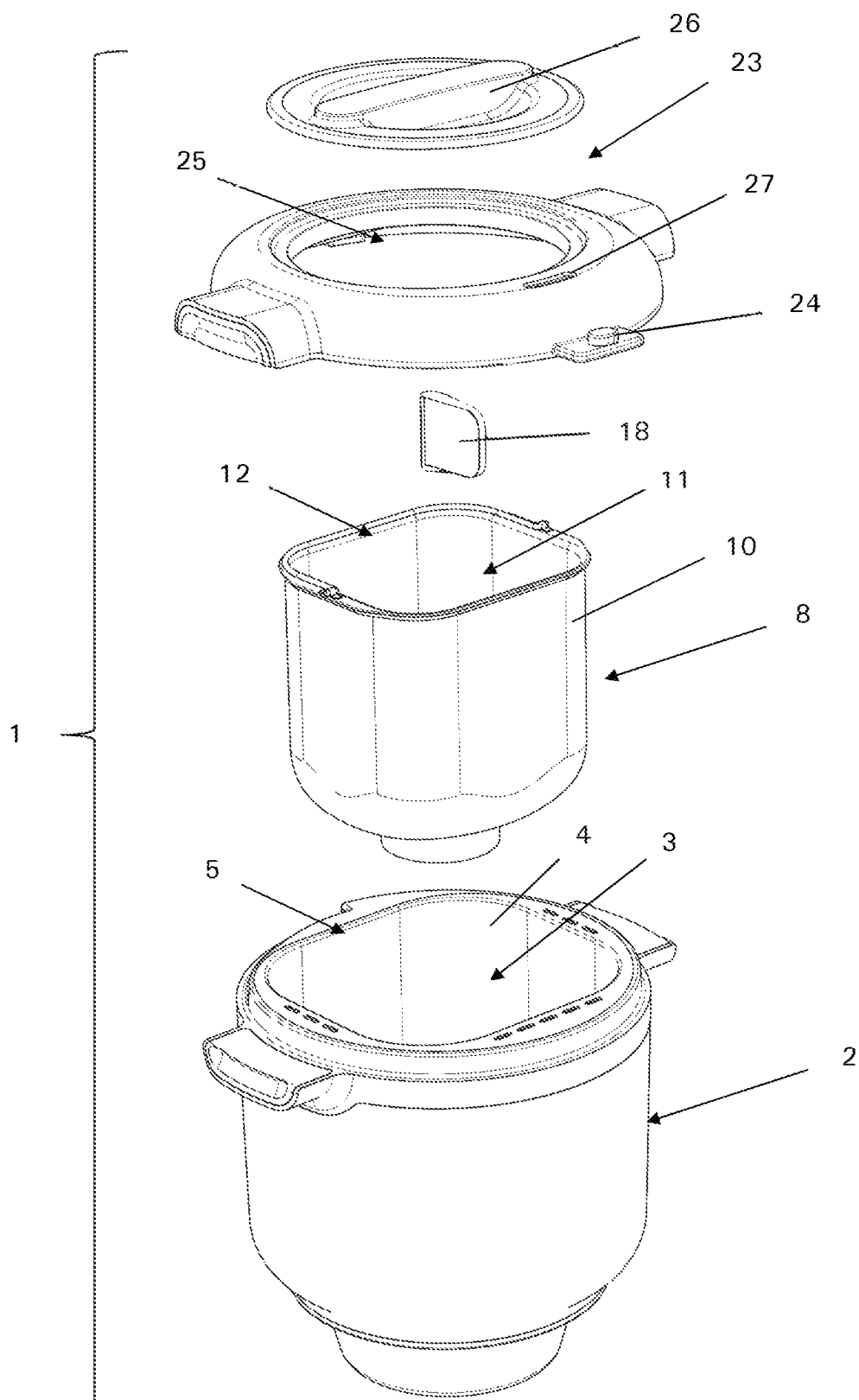
FIG. 1 a baking attachment according to the invention in accordance with a possible embodiment, in an exploded view.
Figure 2:
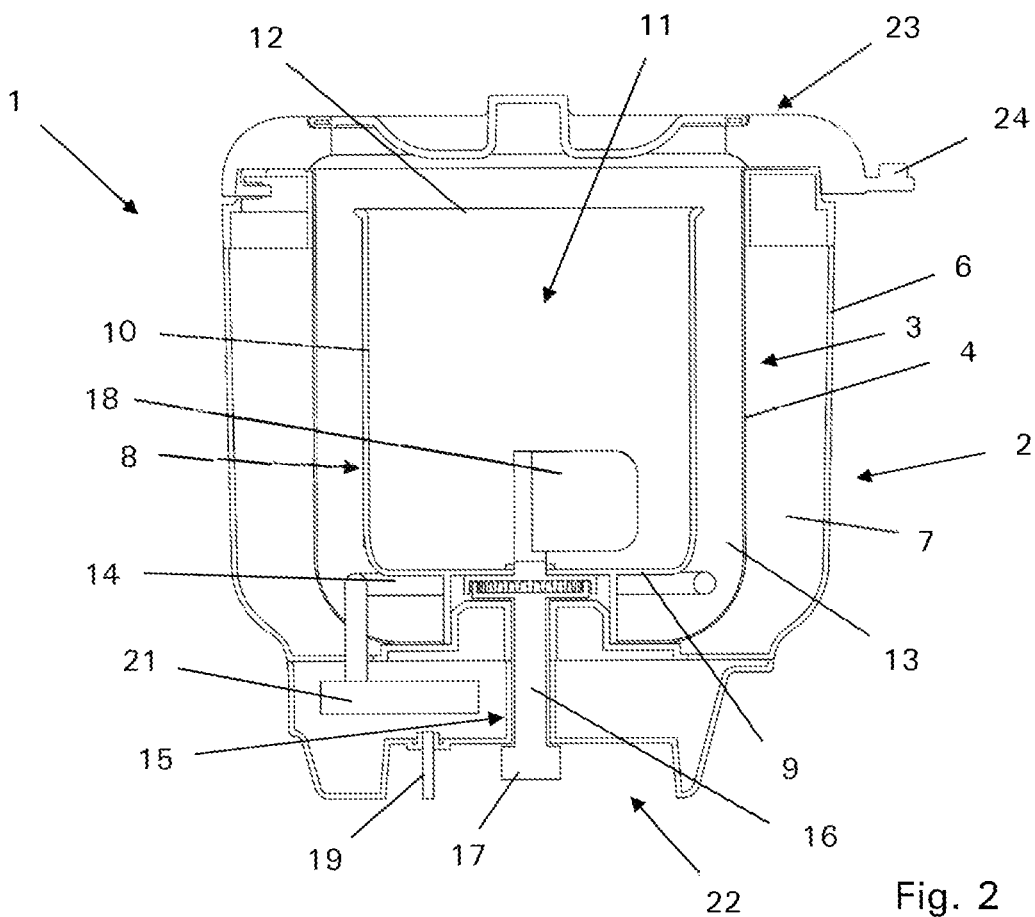
FIG. 2 a longitudinal sectional view of the baking attachment according to FIG. 1.
Figure 3:
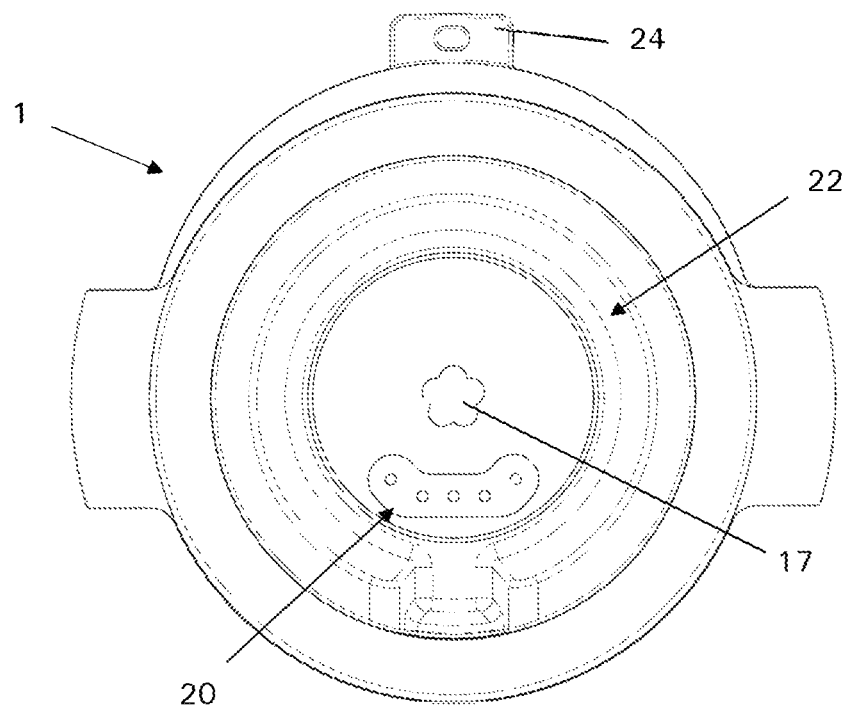
FIG. 3 the connection section formed on the bottom of the baking attachment, in a view of the baking attachment from FIG. 1 from below.

FIGS. 1 to 3 in this case first show a possible embodiment of a baking attachment according to the invention and generally indicated with reference numeral 1. The baking attachment 1 first has an outer container 2, in which a receiving compartment 3 is formed. This receiving compartment 3 is delimited by an inner wall 4 and has an insertion opening 5 placed upward in the usage state, with the receiving compartment 3 being accessible through the insertion opening. The inner wall 4 of the outer container 2 is surrounded by an outer wall 6, in which an intermediate space 7, which is filled with air or a different thermally insulating material, is enabled between the outer wall 6 and the inner wall 4. This arrangement is used to thermally decouple the outer wall 6 of the outer container 2 from the inner wall 4.

A preparation container 8 is inserted into the receiving compartment 3 and detachably connected to the outer container 2, and that is in a region lying underneath in the usage state. The preparation container 8 has a base 9 as well as a circumferential side wall 10, which delimit a preparation compartment 11. The preparation compartment 11 is accessible via an upper opening 12. A further intermediate space 13 is enabled between the inner wall 4 of the outer container 2 and the side wall 10 as well as the base 9 of the preparation container 8. A heating element 14, which is a resistance heating element in this exemplary embodiment, is exclusively arranged on the bottom of the preparation container 8 in this intermediate space 13. Heat can be generated with this heating element by applying a heating current, which heat makes it possible to bake and thus to prepare a baked good, starting from dough, situated in the preparation container 8. The baking attachment 1 further has a mixing and kneading mechanism 15. This has a rotary shaft 16, which has a coupling element 17 on a free end, which is connected to the rotary shaft 16 in a rotationally fixed manner, which rotary shaft is guided through the outer container 2 in a fixed implementation. A mixing and kneading mechanism 18 can be detachably connected to the rotary shaft 16 with an end of the rotary shaft 16 opposite the coupling element 17 and through an opening in the base 9 of the preparation container 8. This mixing and kneading mechanism 18 is arranged in the interior of the preparation compartment 11 of the preparation container 10. In the assembled state shown in FIG. 2, in which the preparation container 8 is inserted into the receiving compartment 3 of the outer container 2, the level of the upper opening 12 of the preparation container 8 is arranged significantly below the level of the insertion opening 5 of the outer container 2. A contact element 19 (not shown in more detail) formed as a type of pin can also be discerned in FIG. 2, which has an electrical connection to the heating element 14. As is shown in FIG. 3, several contact pins are arranged in a contact block 20, in which parts of the contact pins are connected to the heating element 14 via electrical lines, while other parts form sensor contact elements, which are connected to a temperature sensor (not shown in greater detail here) for recording the operating temperature of the baking attachment 1. Also shown—and only schematically here—is an identification carrier 21, which is arranged in a lower section of the baking attachment 1 in the usage state. In this case, it may particularly be an RFID chip which carries an identification code having the baking attachment 1 as such, namely a baking attachment.

On the side opposite the receiving opening 5, which is a lower side in the usage state, a connection section 22 is formed on the outer container 2 of the baking attachment 1, in which connection section particularly the contact block 20 is formed with contact elements 19 and sensor contact elements (not numbered in greater detail here) and in which the coupling element 17 of the rotary shaft 16 is also freely accessible. This connection section 22 is used for placement on and a connection to a kitchen appliance base in a manner which is to be described in greater detail subsequently.

A further component of the baking attachment 1 is a cover 23 which can be connected to the outer container 2 in a completely removable manner and is designed to be lockable on said container. A position indicator 24, which serves to interact with a position sensor on a kitchen appliance base and thus to detect a closed and locked state of the cover 23, is molded onto the cover 23, on an extension. As shown in FIG. 2, the cover 23 allows for a distance apart from the upper opening 12 of the preparation container 8.

The cover 23 has a central opening 25, which can be closed with a lid 26. The lid 26 can be inserted into the opening 25, covering it completely, and is retained there by corresponding means, for example by magnets. In this manner, the upper opening 12 can be made precisely more accessible, even with the cover 23 placed, by removing the lid 26 of the preparation compartment 11, so that ingredients can be incorporated into the preparation compartment 11. Furthermore, the cover 23 has a water vapor outlet opening 27 formed in the shape of a slot and arranged not centrally, which remains unclosed. Water vapor formed during a baking process can escape from the baking attachment 1 through this water vapor outlet opening 27 such that excessive moistening of the baked good can be prevented.

Figure 4:
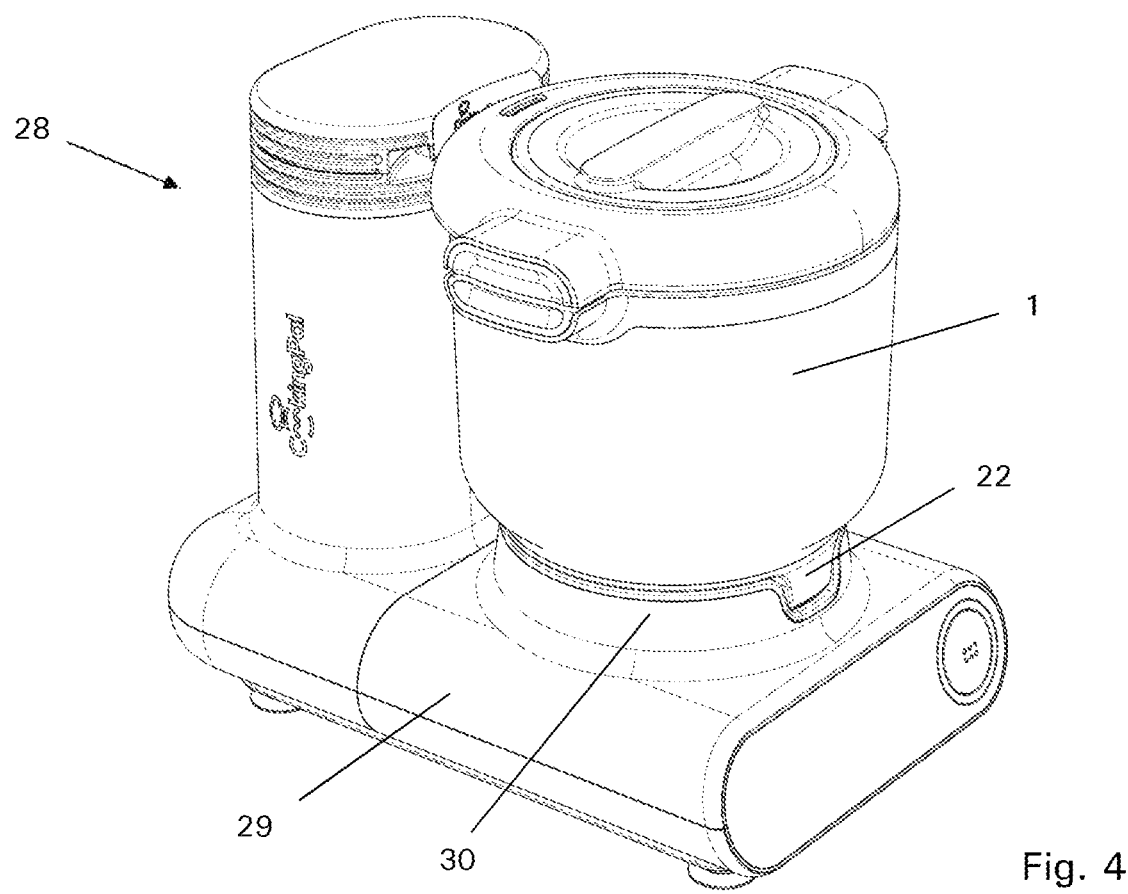
FIG. 4 a possible embodiment of a kitchen appliance according to the invention, which has the form of a baking machine and which is formed by a kitchen appliance base and a baking attachment according to FIG. 1 placed thereupon.

FIG. 4 then shows a kitchen appliance 28 of the type according to the invention. This is formed by a kitchen appliance base 29 and a baking attachment 1 placed thereupon and connected thereto according to FIGS. 1 to 3. The connection section 22 of the baking attachment 1 in this case is inserted into a receiving section 30 of the kitchen appliance base 29 and affixed there.

Figure 5:
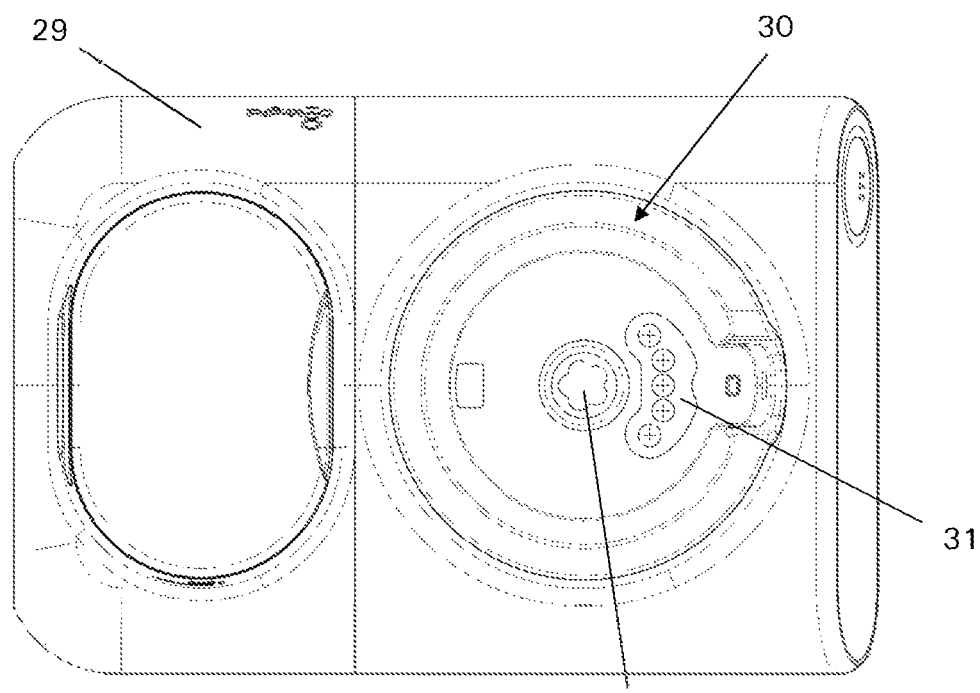
FIG. 5 a top view of the kitchen appliance base of the kitchen appliance from FIG. 4, in which particularly also a receiving region of the kitchen appliance base can be discerned.
Figure 6:
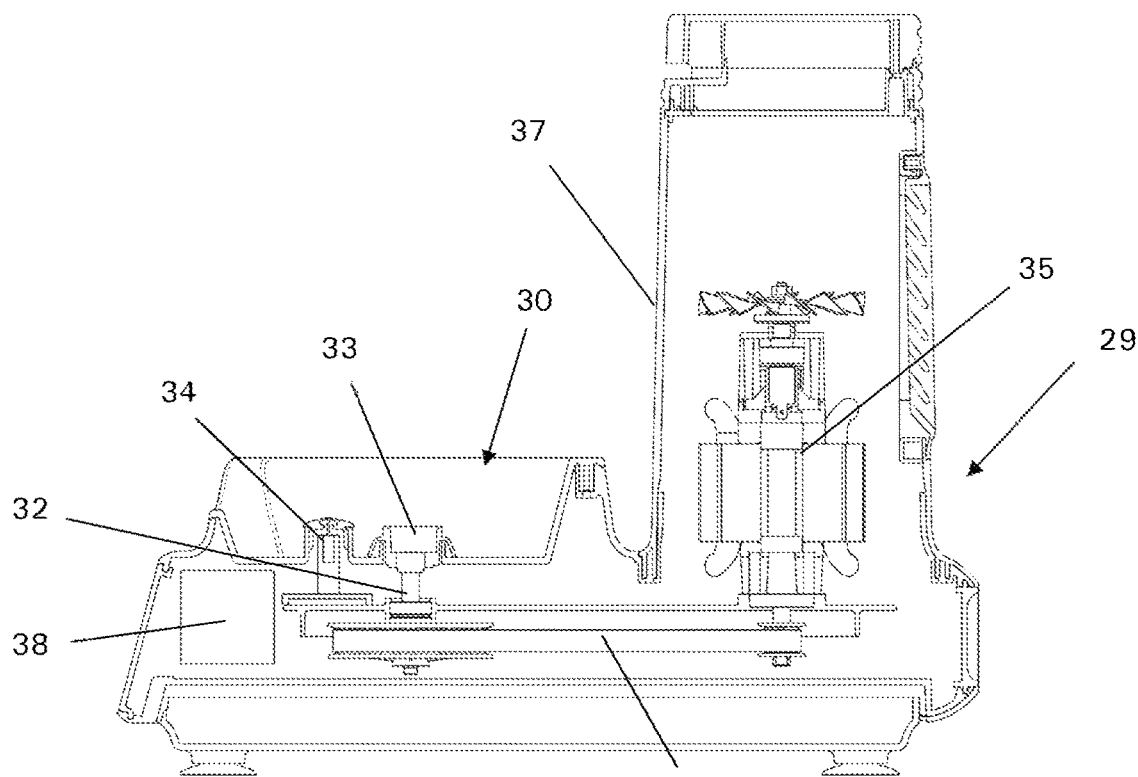
FIG. 6 a cross-sectional view of the kitchen appliance base of the kitchen appliance from FIG. 4.

The kitchen appliance base 29 is shown again in more detail in FIGS. 5 and 6. FIG. 5 particularly shows the receiving section 30, in which a connection block 31 is formed, in which electrical contacts 34 (cf. FIG. 6) and electrical sensor contacts (not described in greater detail) are arranged. It is further shown that a drive shaft 32 leads to the receiving section 30 with a coupling element 33, and the coupling element 33 is exposed there. In the exemplary embodiment shown, a motor 35 arranged in the kitchen appliance base 29 drives the drive shaft 32 in a rotating manner via a drive belt 36. A housing 37 encloses the aforementioned elements and/or installation space of the kitchen appliance base 29 provided for these elements. A controller 38, which contains a reader for reading off the identification carrier 21, is also arranged in the kitchen appliance base 29, within the housing 37. The controller 38 provides control signals and determines the rotational speed and switch position of the motor 35, on the one hand, and a supply of heating current to the electrical contacts 34, on the other hand.

Figure 7:
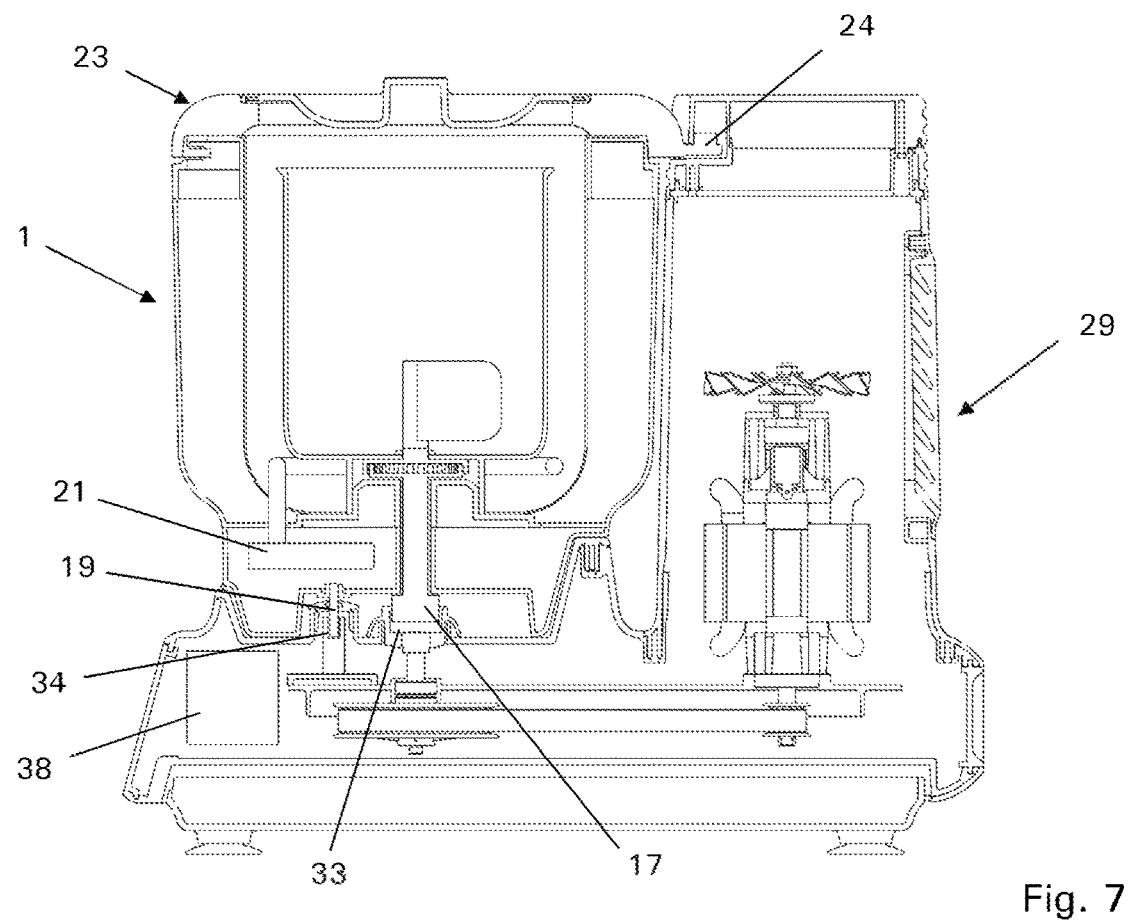
FIG. 7 a cross-sectional view of the kitchen appliance from FIG. 4, i.e. through the kitchen appliance base with the baking attachment placed.

It can easily be discerned in FIG. 7 how the connection section 22 of baking attachment 1 is placed on the receiving section 30 of the kitchen appliance base 29 and inserted therein. It also can be seen here that the connection section 22 and receiving section 30 are designed with corresponding shaping such that they have a precise fit within each other. It can further be seen that the coupling element 17 of the rotary shaft 16 is coupled to the coupling element 33 of the drive shaft 32 and that the electrical contact element 19 is inserted into the electrical contact 34 formed as a female contact, and thus an electrical contact is established. It can further be seen that the position indicator 24 is inserted into a section of the housing 37 where it operates a position sensor, which is not shown in greater detail, such that a securely closed and locked position of the cover 23 is displayed. The position sensor, for its part, is connected to the controller 38 and provides a release signal for operating the motor 35 and heating element 14.

Figure 8:
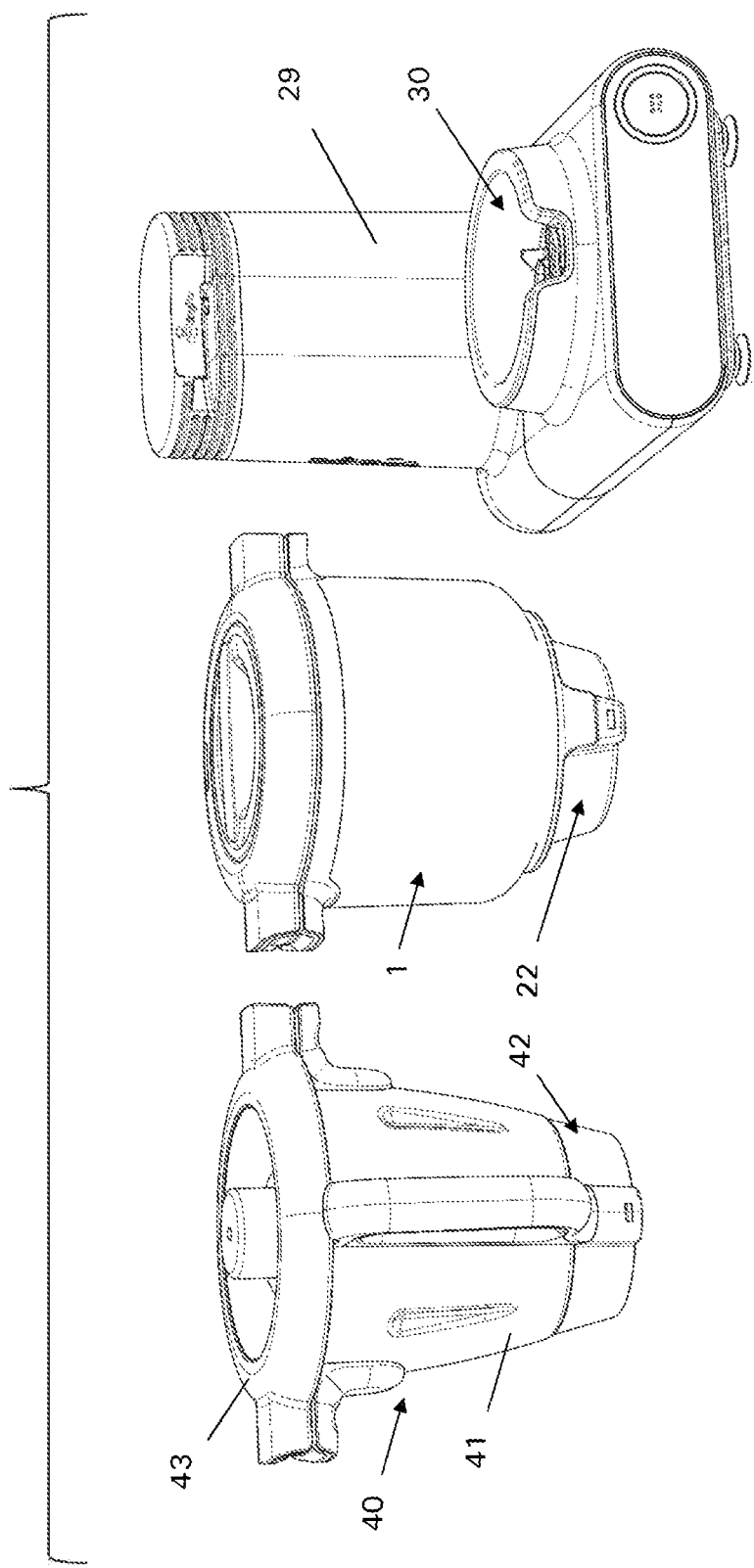
FIG. 8 a kitchen appliance or a kitchen appliance system, with the kitchen appliance base according to FIG. 4, the baking attachment according to FIG. 1, and a cooking attachment as a further component.
Figure 9:
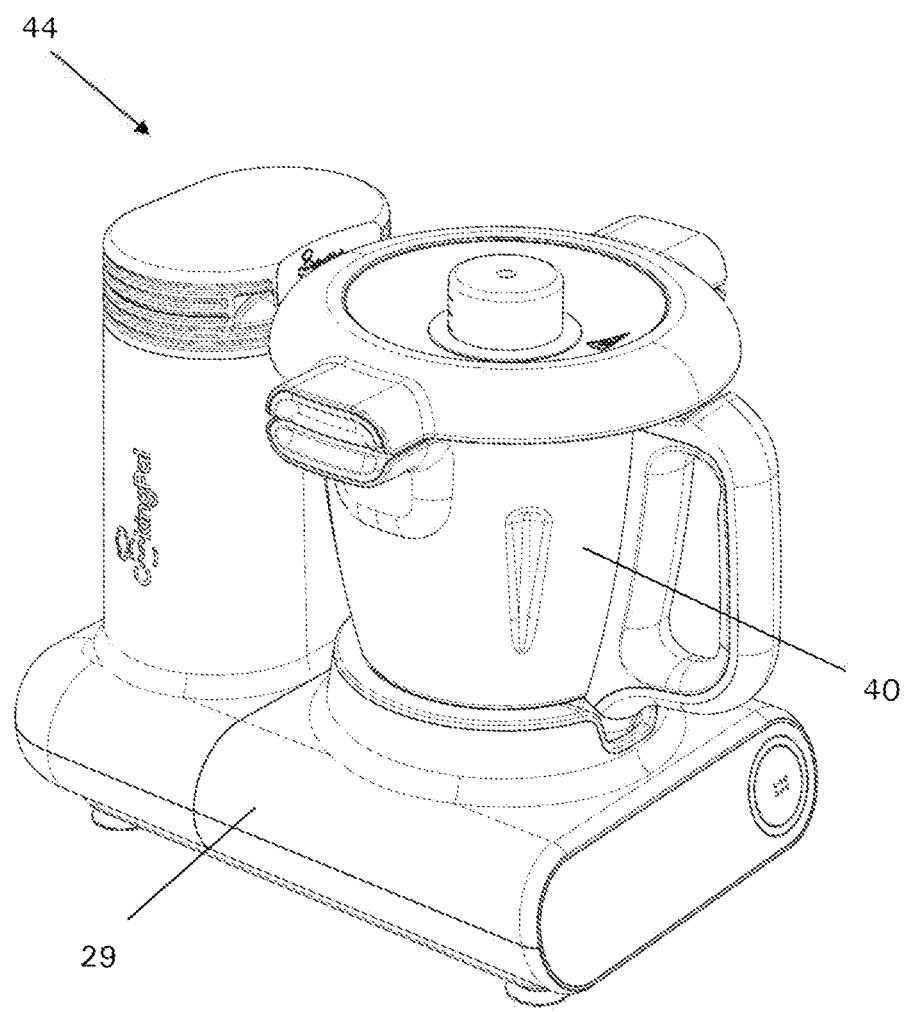
FIG. 9 a kitchen appliance, in the form of a cooking machine, formed from a kitchen appliance system according to FIG. 8, through placement of the cooking attachment onto the kitchen appliance base.

FIG. 8 shows a kitchen appliance set 39 that comprises a cooking attachment 40, in addition to the baking attachment 1 and the kitchen appliance base 29 The cooking attachment 40 has a pot 41, which can be closed with a cover 43 and on which a connection section 42, which is on the bottom in the usage position, is molded, with the connection section possibly corresponding to connection section 22 of the baking attachment 1 and being inserted into the receiving section 30 of the kitchen appliance base 29. A heating element for heating the pot 41 or a cooked good contained therein is arranged, in a known manner, in the cooking attachment 40, which resembles the cooking attachments known from kitchen appliances formed as cooking machines or cooking robots. Furthermore, a mixer is arranged in the pot 41 for chopping and/or mixing a cooked good situated in the pot 41. The mixer emerges not shown in greater detail here—in the connection section 42 likewise with a coupling element, which is established on a rotary shaft belonging to the mixer and which resembles the coupling element 17 on the baking attachment 1, and correspondingly can be coupled to the coupling element 33 on the kitchen appliance base 29. Contact elements, which resemble the contact elements with respect to the position and design thereof as they are arranged in the contact block 20 of the baking attachment 1, are also provided on the cooking attachment 40 in the connection section 42, such that they can also be placed into contact with the electrical contacts in the connection block 31 of the kitchen appliance base 29. In this manner, a kitchen appliance 28, as is shown in FIG. 4, can be formed from the kitchen appliance set 39, with said kitchen appliance automatically implemented baking can take place. However, a kitchen appliance 44 can likewise be formed, as is shown in FIG. 9, i.e. a known kitchen appliance as a type of cooking robot. In this case, the baking attachment 1 and cooking attachment 40 are dimensioned such that particularly the covers 23 and 43 are designed such that both attachments can interact with the kitchen appliance base 29. The cover 43 of the cooking attachment in this case also has an extension (not shown in greater detail here) with a position indicator, which resembles the position indicator 24 on the cover 23 of the baking attachment 1 and interacts, in the same manner, with the kitchen appliance base 29 and the position sensor arranged therein in order to indicate a securely locked closure of the cover 43 with the kitchen appliance 44 and to provide a corresponding signal to the controller 38. Both kitchen appliances 28 and 44 in this case are formed with one and the same kitchen appliance base 29, which is only present once in the kitchen appliance set 39.

An identification carrier, for example an RFID chip, which has the cooking attachment 40 as such and which makes it discernible for the reader on the controller 38 of the kitchen appliance base 29, may likewise be arranged in the cooking attachment 40 in the connection section 42. In this manner, the controller 39 of the kitchen appliance base 29 can carry out a basic setting for the operation of the kitchen appliance, particularly for specifying rotational speed values of the motor 35 and/or for specifying heating currents for operating the heating element 14 or a heating device in the cooking attachment 40, as a function of the attachment placed, whether baking attachment 1 or cooking attachment 40.

In the present exemplary embodiment, the kitchen appliance base 29 is shown as a comparatively simply constructed device. However, the kitchen appliance base 29 may also be constructed, for example, more complexly with further functions, for example with an integrated weighing device for weighing contents filled in the connected attachment or also with a display device for displaying optical outputs to an operator, for example a touchscreen monitor. Recipes downloaded from an Internet connection or status and/or error messages can be displayed on this display, e.g. in the controller or in a connected data carrier or even via an interface integrated into the kitchen appliance base 29. User inputs can also occur.

A kitchen appliance 28 in the form of a baking machine formed through the combination of the kitchen appliance base 29 with the baking attachment 1 is operated in the customary manner as is typical for baking machines of a conventional type. This means that recipes are processed in which a user fills ingredients such as, for example, flour, water, yeast, salt, sugar, grains in the preparation compartment 11, then places and locks the cover 23, and then the mixing and kneading mechanism 15 is placed into operation and this mixture is mixed and kneaded with the mixing and kneading tool 18, which is formed like a paddle here, until a uniform dough is obtained. This dough is subsequently allowed to rise, for example with the supply of low heat by the heating element 14, then e.g. kneaded again, then allowed to rest and allowed to rise again until the actual baking process begins due to the increase in heating output of the heating element 14 and thus the temperature. In particular, a timer function can be specified by the controller 38 such that the baking process is started at a time so that a baked good to be prepared will be finished at a target time, for example a loaf of bread for breakfast in the morning, in order to then be able to provide and consume freshly baked bread.

The previous description of exemplary embodiments and variants again makes it clear which particular advantage is provided by the design according to the invention of a baking attachment and a kitchen appliance formed from the combination of a kitchen appliance base and such a baking attachment. Even though various further, sometimes especially advantageous features are disclosed in the previous description of exemplary embodiments and variants, these particular details are not intended to limit the invention and its general scope. The invention is determined in its general scope in the following claims, and further possible design variants could easily occur to one skilled in the art even with consideration of the aforementioned description.

LIST OF REFERENCE NUMERALS

1 Baking attachment
2 Outer container
3 Receiving compartment
4 Inner wall
5 Insertion opening
6 Outer wall
7 Intermediate space
8 Preparation container
9 Base
10 Side wall
11 Preparation compartment
12 Upper opening
13 Intermediate space
14 Heating element
15 Mixing and kneading mechanism
16 Rotary shaft
17 Coupling element
18 Mixing and kneading tool
19 Contact element
20 Contact block
21 Identification carrier
22 Connection section
23 Cover
24 Position indicator
25 Opening
26 Lid
27 Water vapor outlet opening
28 Kitchen appliance
29 Kitchen appliance base
30 Receiving section
31 Connection block
32 Drive shaft
33 Coupling element
34 Electrical contact
35 Motor
36 Drive belts
37 Housing
38 Controller with reader
39 Kitchen appliance set 40 Cooking attachment
41 Pot
42 Connection section
43 Cover
44 Kitchen appliance

The invention claimed is:

1. A baking attachment for a kitchen appliance, said baking attachment comprising:
an outer container with inner walls which enclose a receiving compartment said outer container having an insertion opening at a top;
a preparation container having a base and side walls, said preparation container having an upper opening and having a preparation compartment, wherein said preparation container is arranged in the receiving compartment of the outer container such that an intermediate space is formed between the base and the side walls of the preparation container and the inner walls of the outer container enclosing the receiving compartment;
a heating device arranged in the intermediate space;
a mixing and kneading mechanism having a rotary shaft guided through the base of the preparation container and through a base section of the outer container, said mixing and kneading mechanism further including a mixing and kneading tool which is connected to the rotary shaft and is arranged in the preparation container; and
a cover for closing the insertion opening;
wherein the outer container has a connection section in a region of the base section for detachable insertion into a receiving section of a kitchen appliance base, wherein a free end of the rotary shaft is arranged in the connection section, wherein the free end has a first coupling section for rotationally fixed connection to a second coupling section arranged on a drive shaft of the kitchen appliance base, and wherein electrical contact elements electrically connected to the heating device are arranged in the connection section for detachable connection to electrical contacts of the kitchen appliance base; and
wherein when the preparation container is inserted into the receiving compartment the preparation container's upper opening is positioned below the insertion opening such that the cover does not close the upper opening of the preparation container when the cover is arranged in a closing position which closes the insertion opening.

2. The baking attachment according to claim 1, wherein the preparation container is detachably insertable into the receiving compartment.

3. The baking attachment according to claim 1, wherein the mixing and kneading tool is detachably connectable to the rotary shaft.

4. The baking attachment according to claim 1, further comprising connection structures provided on the outer container and mating structures provided on the cover, wherein the cover is lockingly settable due to the interaction between the connection structures and the mating structures on the outer container.

5. The baking attachment according to claim 1, wherein the cover is completely removable from the outer container.

6. The baking attachment according to claim 1, further comprising a position indicator section provided on the cover for interacting with a position sensor on the kitchen appliance base said position indication section being provided for monitoring a cover position which is completely locked and closing off the receiving compartment.

7. The baking attachment according to claim 1, further comprising a temperature sensor for determining a temperature of the preparation container, the air in the intermediate space, and/or a baked good situated in the preparation compartment, wherein a signal line of the temperature sensor is connected to a signal contact element placed in the connection section.

8. The baking attachment according to claim 1, further comprising an identification carrier arranged on the baking attachment and configured for transmitting a piece of identification information to the kitchen appliance base.

9. The baking attachment according to claim 1, wherein the outer container is formed with double walls with an outer wall thereof surrounding the inner walls.

10. The baking attachment according to claim 1 wherein the cover has an opening and a lid for optionally closing the opening.

11. The baking attachment according to claim 1, wherein the cover has a water vapor outlet opening.

12. A kitchen appliance with a kitchen appliance base, which has a drive shaft and a motor for rotationally driving the drive shaft and which has a controller for controlling the motor and generating a heating current, wherein the kitchen appliance base has a receiving section, to which the drive shaft leads with a second coupling section and in which electrical contacts are arranged for applying the heating current, wherein the kitchen appliance has a baking attachment according to claim 1, wherein the connection section of the baking attachment is insertable into the receiving section and thus is detachably connected to the kitchen appliance base such that the electrical contact elements of the baking attachment have electrical contact with the electrical contacts of the kitchen appliance base and in that the rotary shaft with the first coupling section is connected to the drive shaft in a rotationally fixed manner via the second coupling section for driving the mixing and kneading mechanism.

13. The kitchen appliance according to claim 12 wherein the kitchen appliance base has a position sensor which detects a position of the position indicator section in a position of the cover in which the outer container is secured and locked, and a signal is generated to the controller as a result of this detection.

14. The kitchen appliance according to claim 12, further comprising a reader device arranged in the kitchen appliance base for reading off the identification carrier, wherein the reader device is connected to the controller for transmitting data to the controller.

15. The kitchen appliance according to claim 12, further comprising a cooking attachment with a cooking container which encloses a cooking compartment and has an upper opening, a heating device arranged in the cooking container, and a mixer, which is detachably arranged on the cooking container and protrudes into the cooking compartment, wherein the mixer includes a rotary shaft and mixing means established on the rotary shaft, as well as a cover for closing the upper opening of the cooking container, wherein the cooking container has a connection section and, in the connection section, a free end of the rotary shaft has electrical contact elements electrically connected to first coupling means and to the heating device, wherein the connection section of the cooking attachment is insertable into the receiving section and thus is detachably connected to the kitchen appliance base, in that the electrical contact elements of the cooking attachment have electrical contact with the electrical contacts of the kitchen appliance base, and in that the rotary shaft of the mixer with the first coupling section is connected, in a rotationally fixed manner, to the drive shaft via the second coupling section for driving the mixer.

16. The baking attachment according to claim 8, wherein the identification carrier is an RFID chip.

17. The baking attachment according to claim 10, wherein the cover has a central opening.

18. The kitchen appliance according to claim 14, wherein the reader device arranged in the kitchen appliance base for reading off the identification carrier is an RFID reader.

19. The kitchen appliance according to claim 14, wherein the mixing means established on the rotary shaft is mixing blades.

\* \* \* \* \*